UNITED STATES PATENT OFFICE.

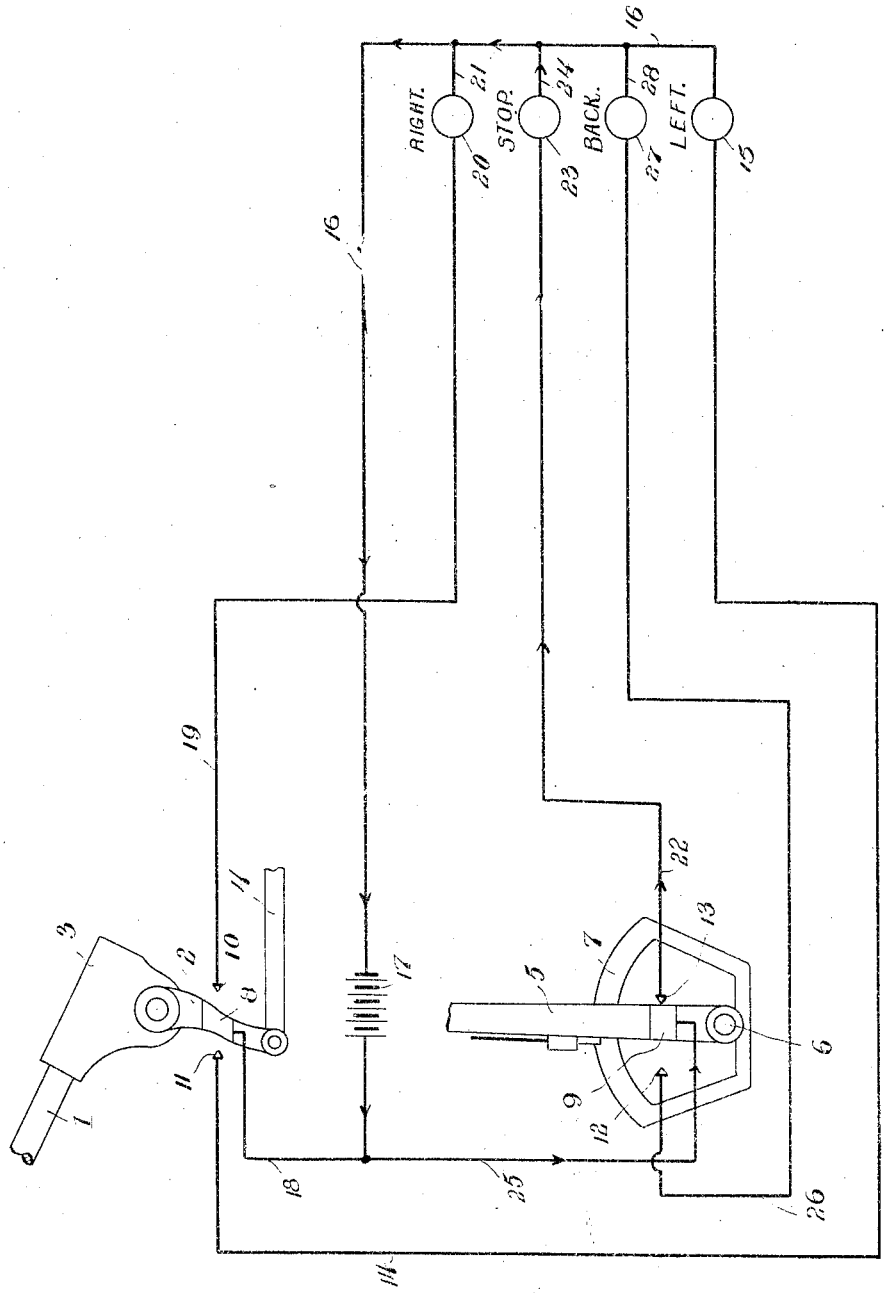

ROBERT G. FALCONER, OF WASHINGTON, DISTRICT OF COLUMBIA.

AUTOMOBILE-SIGNAL.

1,112,278.  Specification of Letters Patent.  Patented Sept. 29, 1914.

Application filed September 14, 1912. Serial No. 720,353.

*To all whom it may concern:*

Be it known that I, ROBERT G. FALCONER, a citizen of the United States, residing at Washington, in the District of Columbia, have invented new and useful Improvements in Automobile-Signals, of which the following is a specification.

This invention relates to electric indicators for automobiles, the object in view being to provide a simple and reliable device which will operate automatically to indicate at the rear of an automobile, motor truck or similar vehicle, the positions of the controls on the automobile, whereby the driver of another machine traveling in rear of the machine equipped with the indicator will be visually advised when the machine is going to turn to the right or to the left, or is going to come to a standstill or reverse and back, the device also indicating when the machine equipped therewith is standing still.

With the above and other objects in view, the invention consists in the construction, combination and arrangement of parts, as will be hereinafter more fully described, illustrated in the accompanying drawings, and pointed out in the claim hereunto appended.

The accompanying drawing represents diagrammatically the invention as applied to the controls of an automobile.

Referring to the drawings, 1 designates the steering post of an automobile, 2 the steering arm, and 3 the bracket or housing for the gears which control the movement between the steering post and said steering arm, 4 designating the connecting rod which leads forward to the steering knuckles of the front or steering wheels.

5 designates the gear shift lever pivotally mounted at 6, and 7 designates the usual segment, in connection with which the gear shift lever moves.

In carrying out the invention, the steering arm 2, which is movable in a fore and aft direction, is provided with an electric contact 8, while the gear shift lever 5 is also equipped with a contact 9. It will be noted that the contacts 8 and 9 are arranged flush with the opposite edges of the respective levers 2 and 5 to which they are secured. Arranged in front of the steering arm 2 is a fixed contact 10, while in rear thereof is another fixed contact 11.

12 designates a fixed contact arranged in rear of the gear shift lever 5, and 13 designates another contact point arranged in advance of said lever.

14 designates a wire leading from the contact 11 through an electric lamp 15 arranged to illuminate the word "Left" on the indicator, 16 designating the common return wire which leads back through a battery 17 and through a branch wire 18 to the contact 8 on the lever 2.

From the contact 10, a wire 19 leads to a lamp 20 adapted to illuminate the word "Right" on the indicator, and from said light a wire 21 leads to the common return wire 16, thence through the battery 17 and branch wire 18 to the contact 8.

From the contact 13, a wire 22 leads to an electric lamp 23 arranged to illuminate the word "Stop" on the indicator, a wire 24 leading therefrom to the common return wire 16, and thence through the battery 17 and through branch wire 25 to the contact 9 on the gear shift lever. From the contact 12, a wire 26 leads to an electric lamp 27 which illuminates the word "Back" on the indicator, a wire 28 leading from said lamp to the common return wire 16, thence through the battery 17 and branch wire 25 to the contact 9 on the gear shift lever.

It will now be observed, after tracing the connections as hereinabove stated, that when the steering wheels are turned to steer the machine to the right, the arm 2 will meet the contact 10 and illuminate the word "Right". When the lever 2 moves in the opposite direction, the word "Left" will be illuminated. When the gear shift lever is moved to a neutral position, it will meet the contact 13 and illuminate the word "Stop" on the indicator, and when the lever 5 is shifted rearward to reverse or back the machine, the lever will meet the contact 12 and the word "Back" will be illuminated on the indicator. Thus the driver of a machine in rear of the machine equipped with the indicator will be able to discern at once whether the machine ahead is going to turn to the right or to the left, or stop or reverse and back. This will avoid many of the accidents now frequently occurring, and the apparatus described will require no attention whatever on the part of the operator of the machine, as the device as a whole is entirely automatic. It will further be seen that two of the words on the indicator may be displayed simultaneously.

For example, when the machine is backing and at the same time turning to the right or to the left. If desired, the signaling system may be further extended in accordance with the foregoing description and accompanying drawing.

What is claimed is:

In a signal apparatus, in combination, two pivots oppositely disposed in alinement, a lever fulcrumed at one end to each of said pivots, an electric contact plate mounted upon each of said levers flush with the opposite edges thereof, two fixed contacts arranged adjacent the opposite edges of the contact plates carried by said levers whereby the edges of each lever may engage with either of said pairs of contacts, a wire connecting the contact plates of said levers, a battery, a plurality of signals, a wire connecting one contact to one of said signal, arranged at the end of a series of signals, a wire leading from said last named signal to one side of the battery, shunt wires connecting the remaining signals with said wire leading to said battery, a wire leading from another signal to the contact opposite to said first named contact, a wire connecting said first named wire to the opposite side of said battery, a wire connecting one of the fixed contacts of the remaining lever with another of said signals, and a wire connecting the remaining fixed contact with the remaining signal.

In testimony whereof I affix my signature in presence of two witnesses.

ROBERT G. FALCONER.

Witnesses:
W. E. PALMER,
BENNETT S. JONES.